United States Patent
Gospodarek

(10) Patent No.: US 9,230,390 B2
(45) Date of Patent: Jan. 5, 2016

(54) VEHICLE BATTERY POINT OF SALE SYSTEM AND METHOD

(71) Applicant: Johnson Controls Technology Company, Holland, MI (US)

(72) Inventor: Dale A. Gospodarek, Kenosha, WI (US)

(73) Assignee: Johnson Controls Technology Company, Holland, MI (US)

( * ) Notice: Subject to any disclaimer, the term of this patent is extended or adjusted under 35 U.S.C. 154(b) by 129 days.

(21) Appl. No.: 14/055,060

(22) Filed: Oct. 16, 2013

(65) Prior Publication Data

US 2014/0121829 A1     May 1, 2014

Related U.S. Application Data

(60) Provisional application No. 61/720,275, filed on Oct. 30, 2012.

(51) Int. Cl.
| | |
|---|---|
| *G07F 11/62* | (2006.01) |
| *G07F 11/00* | (2006.01) |
| *H02J 7/00* | (2006.01) |
| *G07F 15/00* | (2006.01) |

(52) U.S. Cl.
CPC .............. *G07F 11/002* (2013.01); *G07F 11/62* (2013.01); *G07F 15/005* (2013.01); *H02J 7/0027* (2013.01); *Y02T 90/12* (2013.01); *Y02T 90/128* (2013.01)

(58) Field of Classification Search
CPC ............................... G07F 11/62; G07F 11/002
USPC ......................................................... 700/236
See application file for complete search history.

(56) References Cited

U.S. PATENT DOCUMENTS

| | | | | |
|---|---|---|---|---|
| 4,961,507 | A | * | 10/1990 | Higgins ........................ 221/129 |
| 5,544,784 | A | * | 8/1996 | Malaspina .................... 221/135 |
| 5,631,536 | A | | 5/1997 | Tseng |

(Continued)

FOREIGN PATENT DOCUMENTS

| | | |
|---|---|---|
| CN | 200959144 Y | 10/2007 |
| CN | 202205257 U | 4/2012 |

(Continued)

OTHER PUBLICATIONS

Steven David Smith. Sony Retro Battery Vending Machine, Tokyo Block, Tokyo Story, http://stephendavidsmith.net/tokyostory/category/technology/ Jun. 13, 2011.

(Continued)

*Primary Examiner* — Timothy Waggoner
(74) *Attorney, Agent, or Firm* — Fletcher Yoder, P.C.

(57) ABSTRACT

A point of sale battery distribution system includes a cabinet in which batteries may be stored, a user interface for facilitating selection and purchase of batteries, and doors which may be secured and freed to be opened based upon purchase transactions. Batteries stored in the cabinet may be charged by a charging system until purchase. The charging system may provide one or more charging voltages and regimes, and output of the charging system may be disabled by a control system when a door is open or freed to be open. An inventory management system may detect batteries stored in the cabinet and convey inventory information to remote systems for replenishment of the cabinet based upon purchases.

23 Claims, 2 Drawing Sheets

(56) References Cited

U.S. PATENT DOCUMENTS

| | | | |
|---|---|---|---|
| 6,154,006 A * | 11/2000 | Hatanaka et al. | 320/109 |
| 6,181,981 B1 * | 1/2001 | Varga et al. | 700/236 |
| 6,498,457 B1 * | 12/2002 | Tsuboi | 320/110 |
| 8,484,068 B2 * | 7/2013 | Godwin et al. | 705/7.31 |
| 8,560,147 B2 * | 10/2013 | Taylor et al. | 701/2 |
| 2003/0141840 A1 * | 7/2003 | Sanders | 320/107 |

FOREIGN PATENT DOCUMENTS

| | | |
|---|---|---|
| CN | 102663850 A | 9/2012 |
| EP | 0902521 A2 | 3/1999 |
| KR | 20110087627 A | 8/2011 |
| KR | 101117581 B1 | 2/2012 |
| WO | 8501812 | 4/1985 |

OTHER PUBLICATIONS

Cassandra Profita, Rechargeable Battery Dispensers Debut At Whole Foods, OPB.org, http://www.opb.org/news/blog/ecotrope/north-west-whole-foods-add-rechargeable-battery-dispensers/ Apr. 4, 2013.

* cited by examiner

VEHICLE BATTERY POINT OF SALE SYSTEM AND METHOD

CROSS REFERENCE TO RELATED APPLICATIONS

This application claims priority from and the benefit of U.S. Provisional Application Ser. No. 61/720,275, entitled "VEHICLE BATTERY POINT OF SALE SYSTEM AND METHOD," filed Oct. 30, 2012, which is hereby incorporated by reference in its entirety for all purposes.

BACKGROUND

The present invention relates generally to the field of vehicle battery distribution, and more particularly to techniques for allowing consumer-driven transactions and access to batteries through automated, self-contained vending systems.

Vehicle batteries are typically installed into vehicles as original equipment, and are replaced from time to time as the original batteries become aged. Conventional techniques for identifying, selecting, and obtaining replacement batteries have focused on visits to retail establishments where clerks or mechanics can identify the battery to be replaced, counsel the consumer regarding a replacement, sell the replacement, and install it in the vehicle. Increasingly, vehicle owners would like the option to replace the batteries themselves, and may turn to various retail establishments where they can either purchase a replacement battery based on known information, or bring their old battery in for comparison and identification of an appropriate replacement. The vehicle owner then may perform the replacement themselves and return the old battery for disposal. Such approaches are beginning to appear, but still in conventional retail settings (e.g., where batteries may be found on store shelves or requested from clerks).

While such systems generally function adequately, they are not with drawbacks. For example, retail establishments in which mechanics and clerks are relied upon for battery replacement may lead to delays, particularly where the vehicle owner must wait for the qualified personnel to become available and service their vehicle. Moreover, the vehicle owner must generally visit such establishments during regular business hours, which may be quite inconvenient for many people. Where more automated systems are provided, or where consumers may help themselves to store stocks, time constraints nevertheless are imposed at least to the extent that the vehicle owners must visit these establishments during the hours in which they are open.

While certain automated systems have been developed for a range of consumer goods, these are not easily adapted to the offer, sale, and delivery of vehicle batteries. For example, while batteries may be offered without a fresh charge, most consumers would prefer to buy batteries that are "topped off" and ready for service. To the extent that retail establishments do not perform this type of operation for battery stocks, systems that would allow for the sale of freshly charged batteries would represent a significant improvement. Moreover, a technique that would free the vehicle owner of particular time and location constraints would also be significantly advantageous.

SUMMARY

The present invention provides a vehicle battery point of sale technique designed to respond to such needs. In accordance with one embodiment of the invention, for example, a vehicle battery distribution system, comprises a cabinet configured to hold batteries for purchase, the cabinet including at least one door that is selectively secured from opening and freed to open for extraction of a battery from the cabinet. A user interface is associated with the cabinet and configured to facilitate battery purchase transactions for the purchase of batteries disposed in the cabinet. A control system is coupled to the user interface and to the door and configured to control securing and freeing of the door in response to battery purchase transactions.

In accordance with another aspect of the invention, a vehicle battery distribution system, comprises a cabinet configured to hold batteries for purchase, the cabinet including at least one door that is selectively secured from opening and freed to open for extraction of a battery from the cabinet, and a user interface associated with the cabinet and configured to facilitate battery purchase transactions for the purchase of batteries disposed in the cabinet. A battery charging system receives power from a source and provides power to maintain a charge on the batteries disposed in the cabinet. A control system is coupled to the user interface and to the door and configured to control securing and freeing of the door in response to battery purchase transactions. The control system is also operative to cause disabling of output of the battery charging system when a door is open or freed to be opened.

In accordance with a further aspect, a vehicle battery distribution system, comprises a cabinet configured to be located both in an inside or an outside environment and to hold batteries for purchase, the cabinet including at least one door that is selectively secured from opening and freed to open for extraction of a battery from the cabinet, and a user interface associated with the cabinet and configured to facilitate battery purchase transactions for the purchase of batteries disposed in the cabinet. A battery charging system receives power from a source and provides power to maintain a charge on the batteries disposed in the cabinet, and a data exchange component is configured to exchange data with a remote system to facilitate the purchase transactions. A control system is coupled to the user interface and to the door and configured to control securing and freeing of the door in response to battery purchase transactions. Here again, the control system is operative to cause disabling of output of the battery charging system when a door is open or freed to be opened.

DRAWINGS

DETAILED DESCRIPTION

Figure 1:
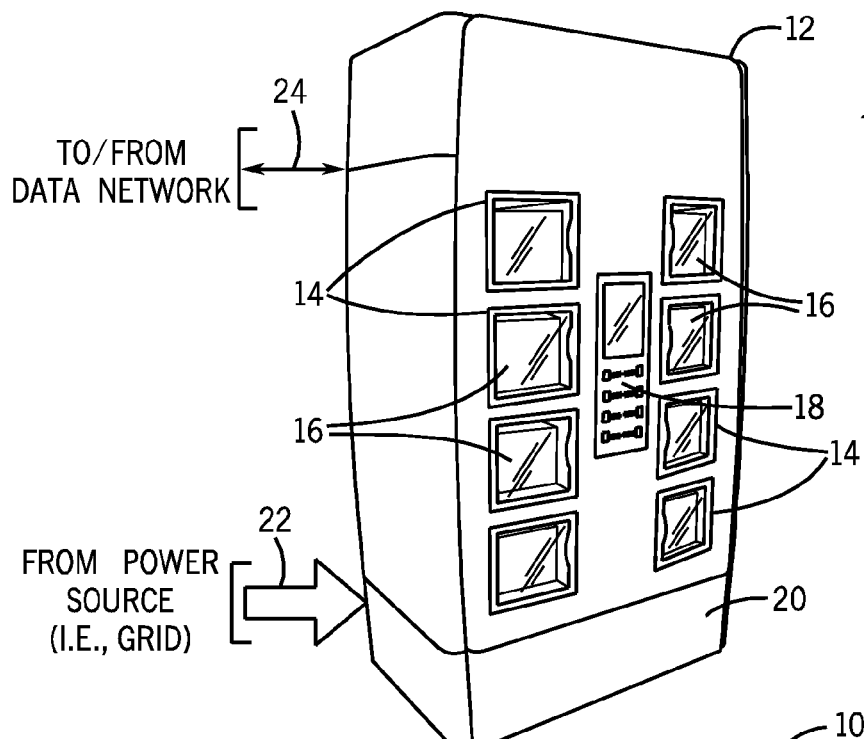
FIG. 1 is a perspective illustration of an exemplary point of sale battery distribution system in accordance with aspects of the present techniques.

Turning now to the drawings, and referring first to FIG. 1, a point of sale battery distribution system is illustrated and designated generally by reference numeral 10. The system comprises a cabinet 12 having a series of doors 14 on a front side. Behind each of the doors are batteries 16 that are offered for sale to vehicle owners, and more generally to consumers for any of a variety of needs. In the illustrated embodiment the cabinet is generally vertical, although various arrangements and configurations may be envisaged. For example, the cabinet may be somewhat lower and generally horizontal, depending upon the types of batteries, their weight, and so forth. In general, it may be helpful to provide the batteries that weigh more at a lower position in the system and lighter batteries towards upper positions. The general layout of the configuration of the cabinet may also be altered from that shown. For example, while the doors 14 are illustrated on a front side of the cabinet, similar doors may be provided on a top side or even on lateral sides of a more horizontal cabinet.

The system 10 also includes an integral user interface 18 that allows users to search for, identify, and select appropriate batteries for their needs. The user interface preferably allows not only for some degree of education of the consumer, but also for selection of the batteries, performance of financial transactions for the purchase of a battery, and so forth. In addition to the user interface, one or more storage compartments 20 may be provided in or around the cabinet. Such storage compartments may be utilized for storing returned or used batteries that are brought by vehicle owners who purchase replacements. The recycled batteries disposed in a storage compartment may be collected from time to time as inventory is added to the system. Finally, as illustrated diagrammatically in FIG. 1, the system 10 receives power as indicated at reference numeral 22, from any suitable source, such as the power grid. As discussed in greater detail below, this power may be used in the various operations of the system, for control and powering of the user interface, as well as for maintaining a charge on the batteries stored in the cabinet. Similarly, one or more data connections 24 may be provided to allow the system to exchange data with remote equipment (not shown). Such equipment may include local or remote inventory monitors, transaction systems (e.g., credit card companies), retail establishment networks, and so forth.

Figure 2:
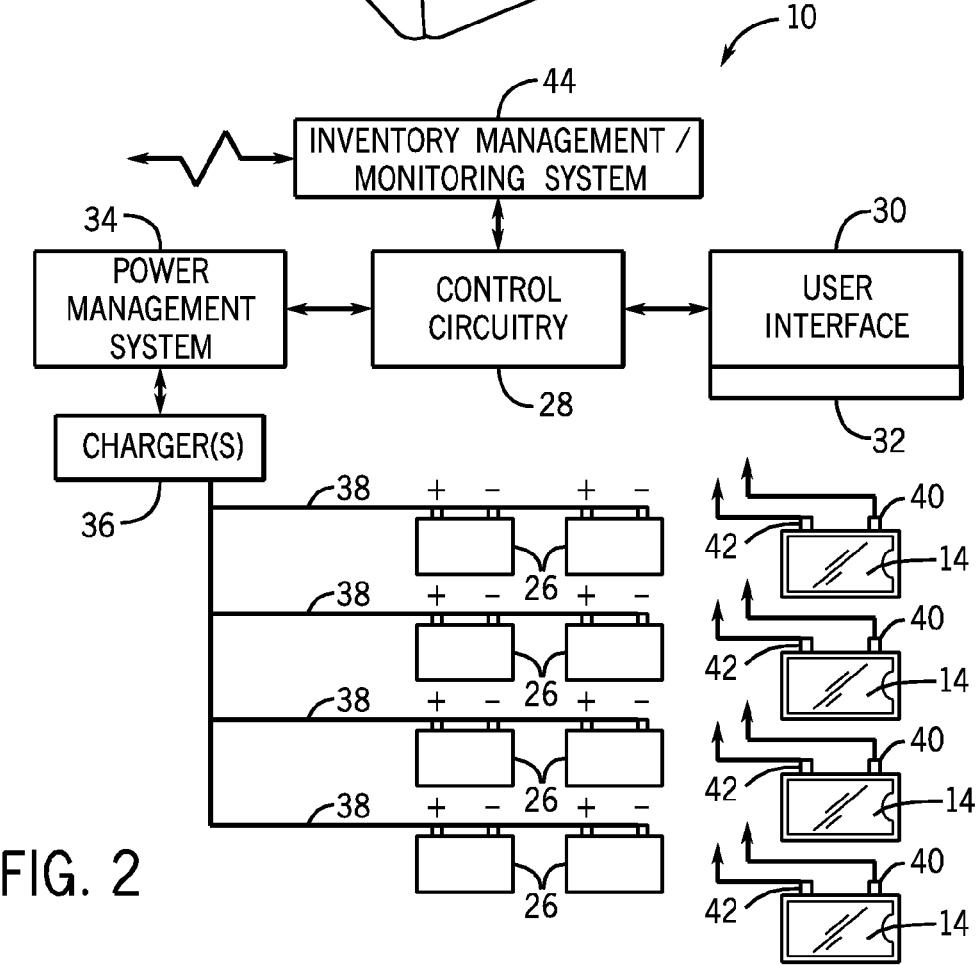
FIG. 2 is a diagrammatical representation of certain of the functional components of the system of FIG. 1.

FIG. 2 is a diagrammatical representation of certain of the functional components of the system illustrated in FIG. 1. As noted above, a series of batteries 26 will be offered for sale and will be disposed in the cabinet described above. These batteries may be of any suitable type, rating, size, technology, and so forth. In presently contemplated embodiments, the batteries are suitable for cars, trucks, motorcycles, boats, all terrain vehicles, and so forth, although any suitable batteries may be accommodated in the system. Where the size and physical configuration of the batteries differ, these may be accommodated by the size and layout of the support structure within the cabinet, doors that are accessed to withdraw the batteries and store the batteries when new inventory is added, and any charging structures. Control circuitry 28 serves to manage the various functions of the system. In certain embodiments this control circuitry may include application-specific or general purpose computers, microprocessors, or other processing circuitry. One or more such processing devices may be included in the system, and these will typically be supported by associated memory, power supplies, and so forth in a conventional manner. A user interface 30 is illustrated and generally corresponds to the interface 28 discussed above. In the illustrated embodiment, one or more readers 32 may be provided, such as for reading credit cards used in purchase transactions. Such readers may also include magnetic or field (e.g., radiofrequency) readers for reading retail establishment loyalty cards and so forth.

The system further includes one or more power management systems designated generally by reference numeral 34. As will be appreciated by those skilled in the art, such power management systems may include circuitry that receives power, such as from the power grid, and converts the power to one or more forms to be used by the various functional components. For example, the power management system 34 may include circuitry for converting power to a DC form and for regulating the power for use by the control circuitry 28, the user interface 30, lights, signage, and audio components, and so forth.

Moreover, the power management system may also condition power for powering one or more battery chargers 36. The battery chargers may be of a conventional nature, and will be adapted to maintain a charge on the batteries disposed within the system. Where more than one voltage rating is provided among the batteries, the charging circuitry may accommodate such ratings, maintaining the appropriate charge on the batteries when disposed in the cabinet for sale. As discussed in greater detail below, the chargers may function to maintain the charge on the batteries, but may be switched off when one or more of the doors of the system is opened, such as to withdraw a battery in a purchase transaction. The charging system may be similarly switched off during loading of new inventory.

In a presently contemplated embodiment, the chargers 36 are linked to the batteries via a power bus system including rails 38 or other conductors that contact terminals of the batteries to maintain a current path used to charge the batteries throughout the time they are disposed in the cabinet. Although a single bus system is illustrated in FIG. 2, where different voltages are provided among the batteries, multiple such bus systems may be separately provided to accommodate the different voltage levels. Similarly, while a single bus 38 or conductor is illustrated as extending toward multiple batteries, in practice it is contemplated that two such conductors will extend to positive and negative terminals of the batteries. These may be provided in an upper location within bays behind the cabinet doors such that batteries may be loaded from arrear of the cabinet, contact the rails, slide toward front positions behind the doors, and may be easily withdrawn upon opening the doors.

As illustrated diagrammatically in FIG. 2, each of the doors 14 is equipped with a controlled latch 40, and one or more sensors 42. The latches, which may comprise solenoid-operated electromechanical mechanisms, are normally locked, but may be unlocked by the control circuitry 28, such as following a successful purchase transaction, thereby allowing the purchased battery to be extracted from the cabinet. The sensors 42 allow for detection that a door is open. As noted above, in a presently contemplated embodiment, power to the batteries is withdrawn upon opening one or more of the doors. This may be performed under the control of the control circuitry 28. Moreover, such power may remain disabled so long as at least one of the sensors 42 detects that a door is open. Only after the sensor has detected the doors are closed will power re-enabled to the conductors used to recharge the batteries.

Finally, as designated by reference numeral 42 in FIG. 2, an inventory management or monitoring system may be provided within the system. Where provided, this inventory management system may serve to monitor the presence of particular batteries within the system. It is contemplated that while many different batteries could be offered for sale, the system may focus on certain common batteries which are moved in higher volumes. By detecting the presence or absence of such batteries, then, the inventory management/monitoring system 44 may allow this data to be conveyed to remote systems that prompt the replacement of sold batteries on a periodic or as-needed basis.

Certain techniques for maintaining charge on the batteries of the system may be the same as or similar to those described in U.S. patent application Ser. No. 13/566,842, entitled Battery Charging Devices and Systems, filed on Aug. 3, 2012, in the name of Feuell et al., which claims priority to U.S. provisional patent application No. 61/531,996, filed on Sep. 7, 2011, both of which are hereby incorporated by reference in its entirety.

Figure 3:
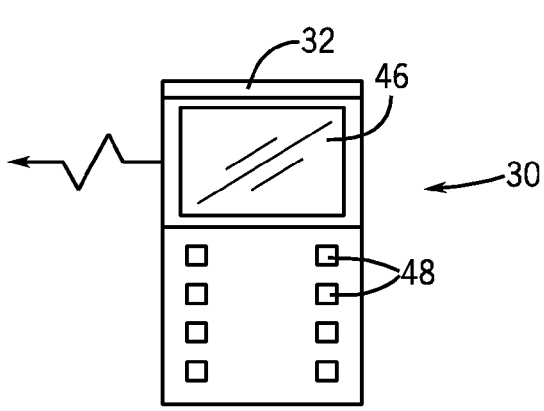
FIG. 3 is a simplified view of a user interface for the same system.

FIG. 3 illustrates an exemplary user interface 30 that may be included in the system. As noted above, the user interface may be equipped with a card reader 32 adapted to read credit cards, debit cards, or any other suitable financial tool, as well as, for example, retail establishment loyalty cards, and so forth. In future implementations, such readers may be capable of detecting and interpreting data from such devices as smart phones, various handheld devices, cards and other supports storing vehicle or battery-related information, and the like. Moreover, a screen or display 46 is provided on which the user may view certain information, navigate to battery selections, view images of vehicles on which the batteries may be used. By way of example, the interface may conform to certain aspects of point of sale systems, such as that described in U.S. patent application Ser. No. 13/275,081, entitled Battery Selection and Feedback System and Method, filed on Oct. 17, 2011, in the name of Gospodarek et al., which is hereby incorporated by reference in its entirety. Such systems may allow for users to become familiar with and comfortable with battery selections based upon questions and answers, recommendations, and the information delivered through the successive display of screens in response to the user touching the display itself or any buttons or other input devices associated with the interface. Certain selection buttons 48 may also be provided, such as to activate the opening of a door behind which a selected battery is positioned. Other user interface devices may clearly also be included, such as audible component (e.g., speakers, microphones, etc.).

Figure 4:
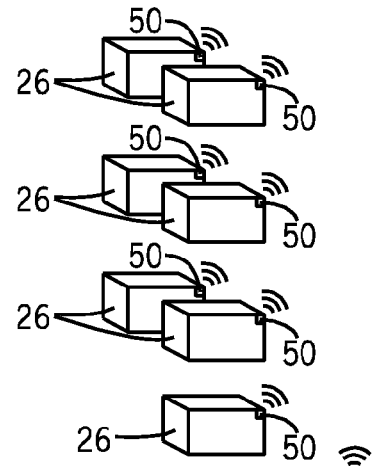
FIG. 4 is a diagrammatical representation of how data may be exchange between stocked batteries in the system and an inventory management system to ensure that proper backstock is maintained to suit demand.

As noted above, the system may be equipped for inventory management and reporting of inventory so that batteries normally kept on hand can be replenished as they are sold. FIG. 4 diagrammatically illustrates a typical arrangement for this inventory management. The inventory management system 44 in this embodiment, is equipped with a radiofrequency reader that can interact with tags 50 disposed on the batteries 26. Each of these tags may be uniquely encoded with information describing the battery, its model or size codes, and other information, where desired (e.g., manufacturing dates, manufacturing history, ship dates, etc.). By "pinging" the tags, the inventory management system can obtain information on which batteries and how many batteries are present in the system and may store this information as transactions occur, and transmit the information to remote systems, such as retail establishment, manufacturer or supplier computer systems, and so forth. Where desired, some or all of the data stored on the batteries may be encrypted and the encrypted code decrypted by the reader for the monitoring and control, inventory management and other functions performed. Other technologies for storage and access to such information may, of course be used.

Figure 5:
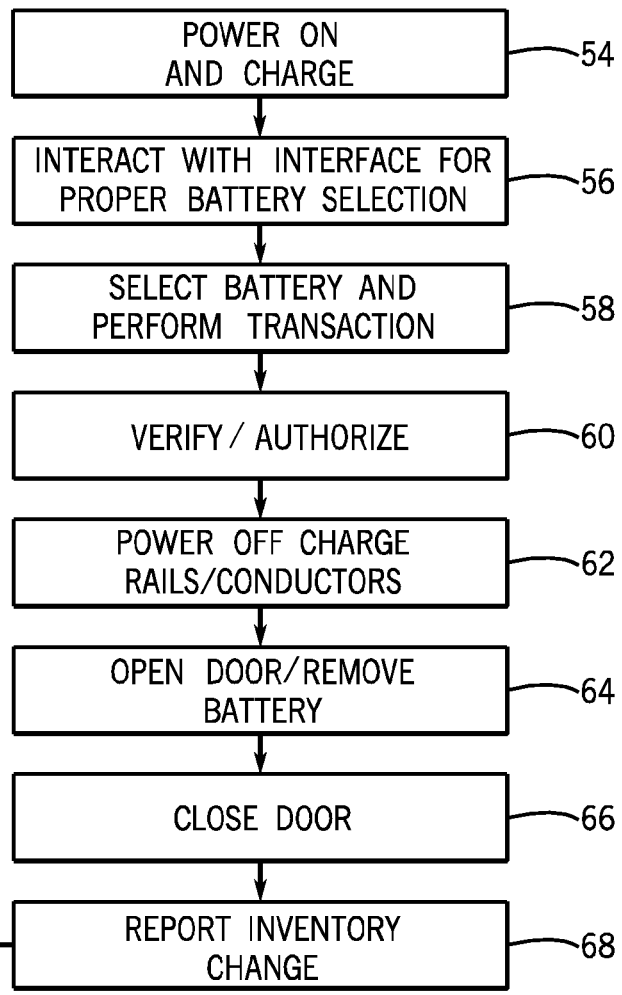
FIG. 5 is a flow chart illustrating exemplary logic in a transaction performed via a system of the type illustrated in the previous figures.

FIG. 5 illustrates exemplary transactional logic 52 for performing a battery selection and purchase transaction on the system. As noted above, the system comprises what is essentially a stand-alone point of sale distribution hub which may be placed inside or outside of any desired location. For example, the system may be placed within a retain establishment, such as an auto parts store, retain store, or any other desired commercial location. However, due to the nature and configuration of the system, it may also be placed in outside environments, such as in front of retail establishments, at desired locations in service stations, and so forth so that transactions may be performed at hours other than those during which a conventional retail establishment is open for business. In all such cases, the system may be equipped to communicate both with a source of power and data to permit the batteries to maintain a sufficient or desired charge, and to allow for verification of transactional information (e.g., credit or debit card data).

The logic of FIG. 5 begins at step 54 where the system is powered on and powers applied to the battery charger and there through to the batteries stored within the cabinet. At step 56, the user interacts with the interface to determine what battery, if any, may be suitable for the desired replacement. Once the information is obtained by the user via the interface, a battery may be selected and the transaction performed as indicated at step 58. This step may include, for example, prompting the user to dial-in or scan a credit card, debit card, or other financial device, followed by verification and authorization of the financial transaction as indicated at step 60. This verification and authorization may comprise conventional techniques for contacting a credit or financial organization, obtaining authorization for the charge, accounting for the charge, and so forth.

With the purchase authorized, the system will power-off the charge rails or conductors as indicated at step 62 and enable opening of a door corresponding to the selected battery. In presently contemplated embodiments all charge rails for all doors are powered off at this stage, and the electronic latch for the door corresponding to the selected battery is energized (or de-energized depending upon its normal state) to allow opening of the door. At step 64, then, the user opens the door and removes the battery. The configuration of the cabinet and supports may then allow for advancement of a battery behind the removed battery, such as on slides, rails, conveyers, or any other desired mechanism. At step 66, then, the user closes the door. In some embodiments, the advancement of another battery may be delayed until the door is closed and verified as secure. Once the system detects that the door is properly shut, the inventory change may be detected as indicated at step 68, the corresponding data may be logged and/or immediately transmitted to a remote inventory management system, and the system may return to step 54 where the entire system remains powered on and the charge of the remaining batteries is resumed.

While only certain features and embodiments of the invention have been illustrated and described, many modifications and changes may occur to those skilled in the art (e.g., variations in sizes, dimensions, structures, shapes and proportions of the various elements without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A vehicle battery distribution system, comprising:
a cabinet configured to hold, for purchase, at least a first type of battery having a first physical configuration and a second type of battery having a second physical configuration different than the first physical configuration, wherein the cabinet includes corresponding first and second doors having first and second physical configurations accommodative of the first and second physical configurations of the first and second types of batteries, respectively, and wherein the first and second doors are selectively secured from opening and freed to open for respective extraction of the first and second types of batteries from the cabinet;
an inventory management component that detects data for batteries disposed in the cabinet for replenishment of batteries based upon purchases;
a user interface associated with the cabinet and configured to facilitate battery purchase transactions for the purchase of batteries disposed in the cabinet; and
a control system coupled to the user interface and to the first and second doors and configured to control securing and freeing of the first and second doors in response to the battery purchase transactions.

2. The system of claim 1, wherein the inventory management component automatically prompts an order for replenishment of batteries based upon purchases.

3. The system of claim 1, comprising a data exchange component configured to exchange data with a remote system to facilitate the battery purchase transactions.

4. The system of claim 3, wherein the user interface comprises a reader capable of reading user information as a basis of the battery purchase transactions, and of communicating the user information to the data exchange component to facilitate the battery purchase transactions.

5. The system of claim 1, wherein the user interface comprises an interactive screen configured to provide a user with information useful in selection of a battery disposed in the cabinet.

6. The system of claim 1, wherein the cabinet is configured for placement in an inside or an outside environment.

7. The system of claim 1, comprising a battery charging system configured to maintain a charge of batteries disposed in the cabinet.

8. The system of claim 7, wherein the battery charging system comprises a battery charger and a rail or conductor structure that conveys charging current to the batteries disposed in the cabinet.

9. The system of claim 7, wherein the first physical configuration of the first type of battery comprises a first voltage rating, the second physical configuration of the second type of battery comprises a second voltage rating different than the first voltage rating, and the battery charging system is configured to provide a first voltage level corresponding to the first voltage rating to the first type of battery and a second voltage level corresponding to the second voltage rating to the second type of battery.

10. The system of claim 7, wherein the battery charging system is coupled to the control system, and wherein the control system is configured to at least partially disable output of the battery charging system when the first or second door is open or freed to be opened.

11. The system of claim 1, wherein the first physical configuration of the first type of battery comprises a first physical size and the second physical configuration of the second type of battery comprises a second physical size greater than the first physical size.

12. A vehicle battery distribution system, comprising:
a cabinet configured to hold batteries for purchase, the cabinet including at least one door that is selectively secured from opening and freed to open for extraction of a battery from the cabinet;
a user interface associated with the cabinet and configured to facilitate battery purchase transactions for the purchase of batteries disposed in the cabinet;
a battery charging system that receives power from a source and provides power to maintain a charge on the batteries disposed in the cabinet, wherein the battery charging system is configured to provide a first voltage level to a first type of battery having a first voltage rating and to provide a second voltage level to a second type of battery having a second voltage rating different than the first voltage rating; and
a control system coupled to the user interface and to the at least one door and configured to control securing and freeing of the at least one door in response to the battery purchase transactions, the control system operative to cause disabling of output of the battery charging system when the at least one door is open or freed to be opened.

13. The system of claim 12, comprising an inventory management component that detects data for batteries disposed in the cabinet for replenishment of batteries based upon purchases.

14. The system of claim 12, comprising a data exchange component configured to exchange data with a remote system to facilitate the battery purchase transactions.

15. The system of claim 14, wherein the user interface comprises a reader capable of reading user information as a basis of the battery purchase transactions, and of communicating the user information to the data exchange component to facilitate the battery purchase transactions.

16. The system of claim 12, wherein the user interface comprises an interactive screen configured to provide a user with information useful in selection of a battery disposed in the cabinet.

17. The system of claim 12, wherein the user interface comprises an input component capable of receiving inputs entered by a user to enable the user to select between the first type of battery and the second type of battery.

18. A vehicle battery distribution system, comprising:
a cabinet configured to be located both in an inside or an outside environment and to hold two or more different types of batteries for purchase, the cabinet including at least one door that is selectively secured from opening and freed to open for extraction of a battery from the cabinet;
a user interface associated with the cabinet and configured to facilitate battery purchase transactions of the two or more different types of batteries for the purchase of at least one of the two or more different types of batteries disposed in the cabinet, wherein the user interface prompts a user to select between the two or more different types of batteries;
a battery charging system that receives power from a source and provides power to maintain a charge on the two or more different types of batteries disposed in the cabinet;

a data exchange component configured to exchange data with a remote system to facilitate the battery purchase transactions; and a control system coupled to the user interface and to the at least one door and configured to control securing and freeing of the at least one door in response to the battery purchase transactions, the control system operative to cause disabling of output of the battery charging system when the at least one door is open or freed to be opened.

19. The system of claim 18, wherein the battery charging system comprises a battery charger and a rail or conductor structure that conveys charging current to the two or more different types of batteries disposed in the cabinet.

20. The system of claim 18, wherein the battery charging system is configured to provide corresponding two or more different voltage levels to the two or more different types of batteries disposed in the cabinet.

21. The system of claim 18, wherein the user interface comprises a reader capable of reading user information as a basis of the battery purchase transactions, and of communicating the user information to the data exchange component to facilitate the battery purchase transactions.

22. The system of claim 18, comprising an inventory management component that detects data for the two or more different types of batteries disposed in the cabinet for replenishment of at least one of the two or more different types of batteries based upon purchases.

23. The system of claim 18, wherein the two or more different types of batteries comprises:

a first type of battery having a first size or voltage rating; and a second type of battery having a second size or voltage rating different than the first size or voltage rating of the first type of battery.

\* \* \* \* \*